July 17, 1956 S. W. SMALL ET AL 2,755,006
DRINK DISPENSING MECHANISM
Filed Oct. 3, 1951 7 Sheets-Sheet 4
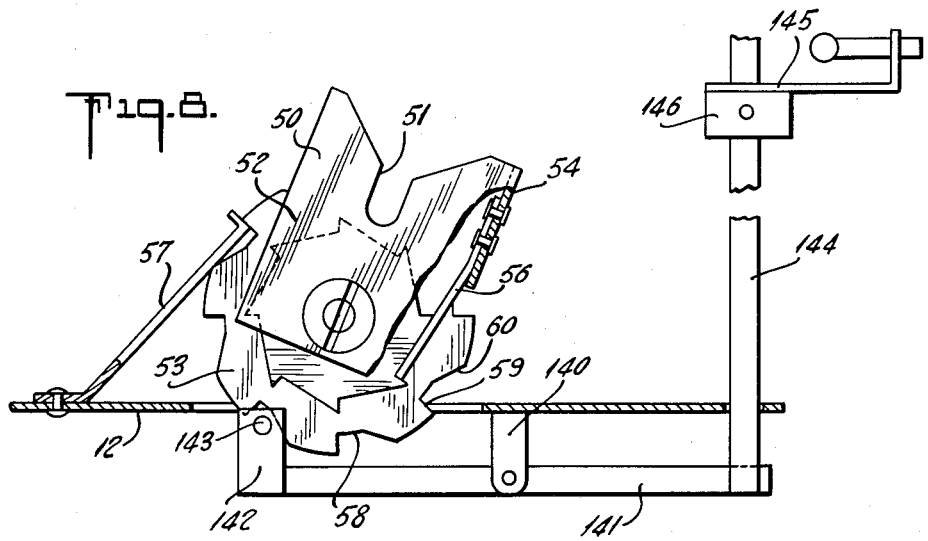
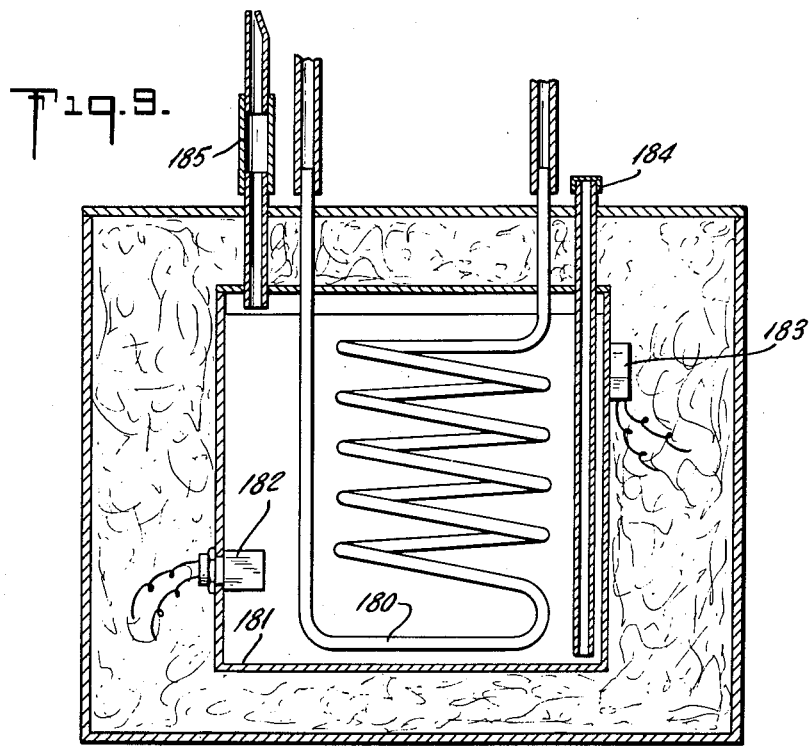
INVENTORS
SOLLIE W. SMALL and
DAVID HERMAN
BY
William R. Liberman
ATTORNEY July 17, 1956 S. W. SMALL ET AL 2,755,006
DRINK DISPENSING MECHANISM
Filed Oct. 3, 1951 7 Sheets-Sheet 5
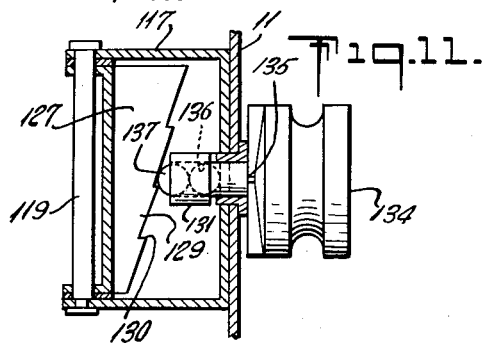
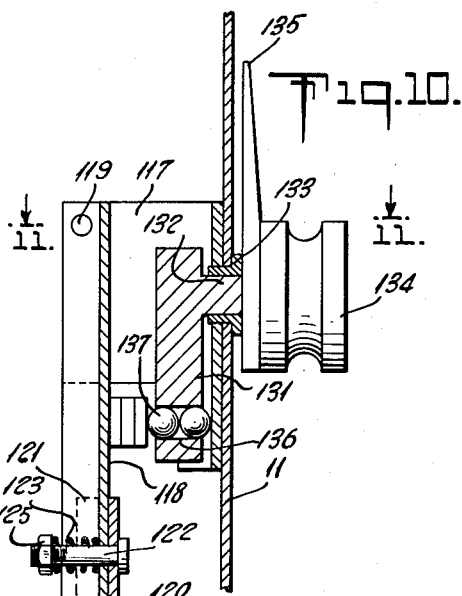
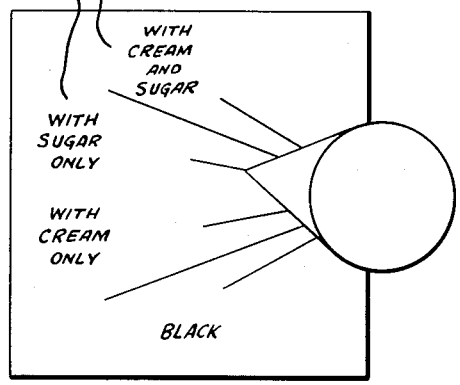
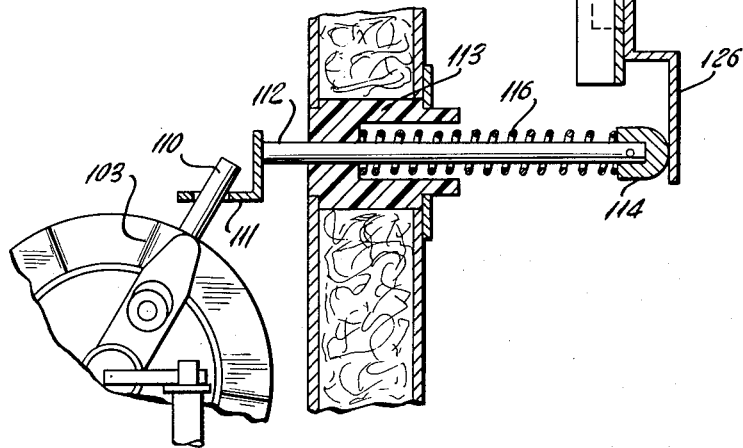
INVENTORS
SOLLIE W. SMALL and
DAVID HERMAN
BY
William R. Liberman
ATTORNEY July 17, 1956 S. W. SMALL ET AL 2,755,006
DRINK DISPENSING MECHANISM
Filed Oct. 3, 1951 7 Sheets-Sheet 6
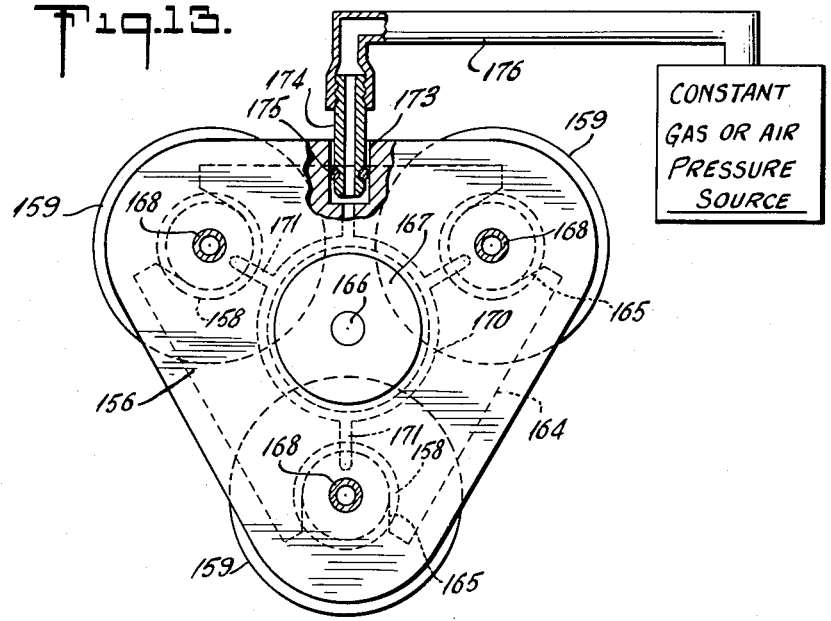
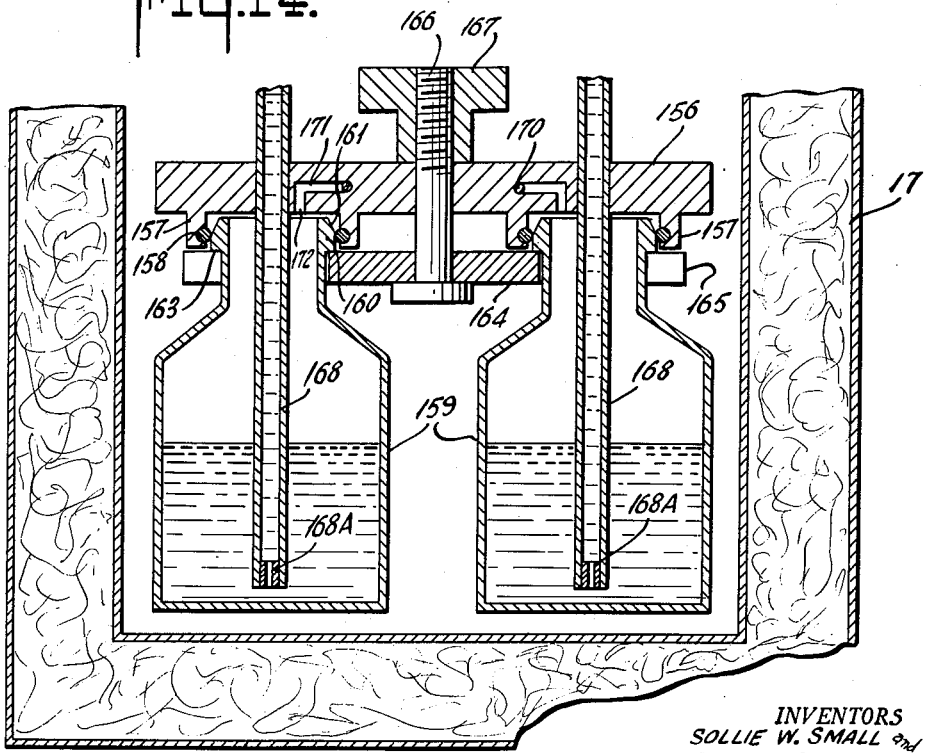
INVENTORS
SOLLIE W. SMALL and
DAVID HERMAN
BY
William R. Lieberman
ATTORNEY

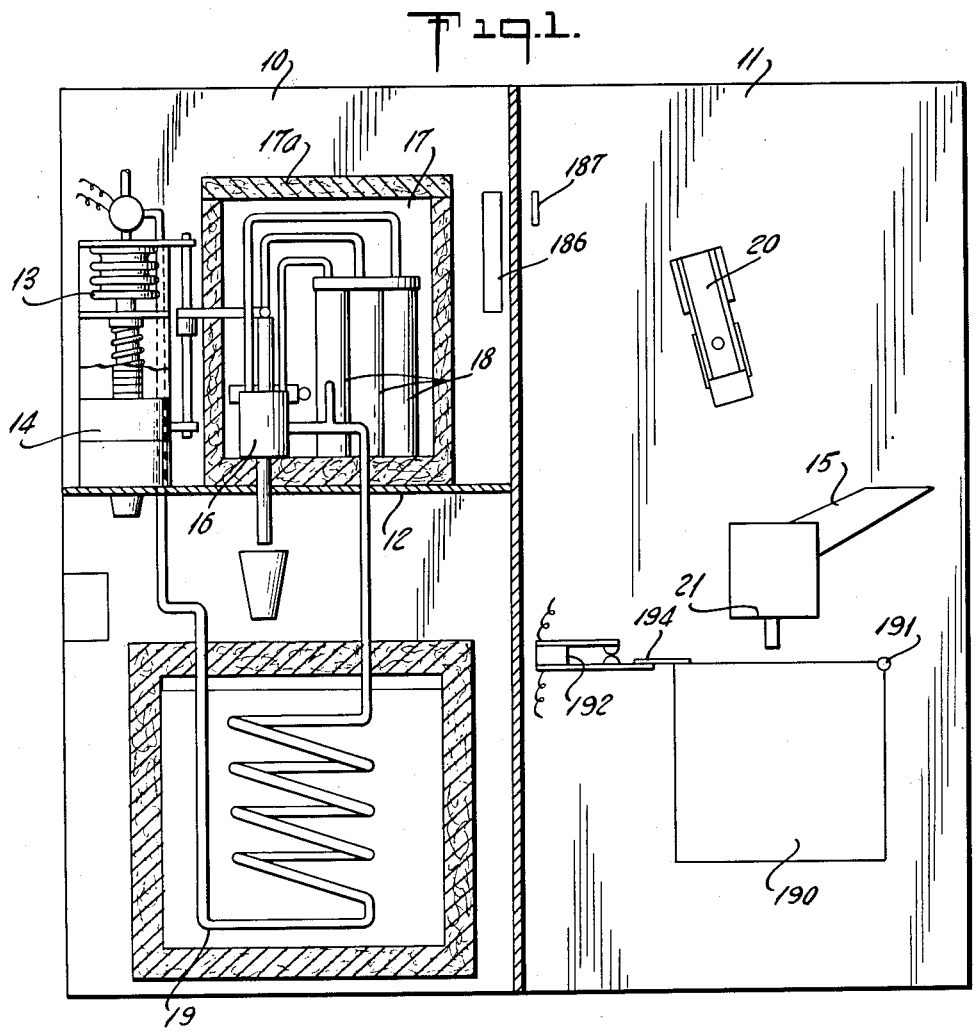

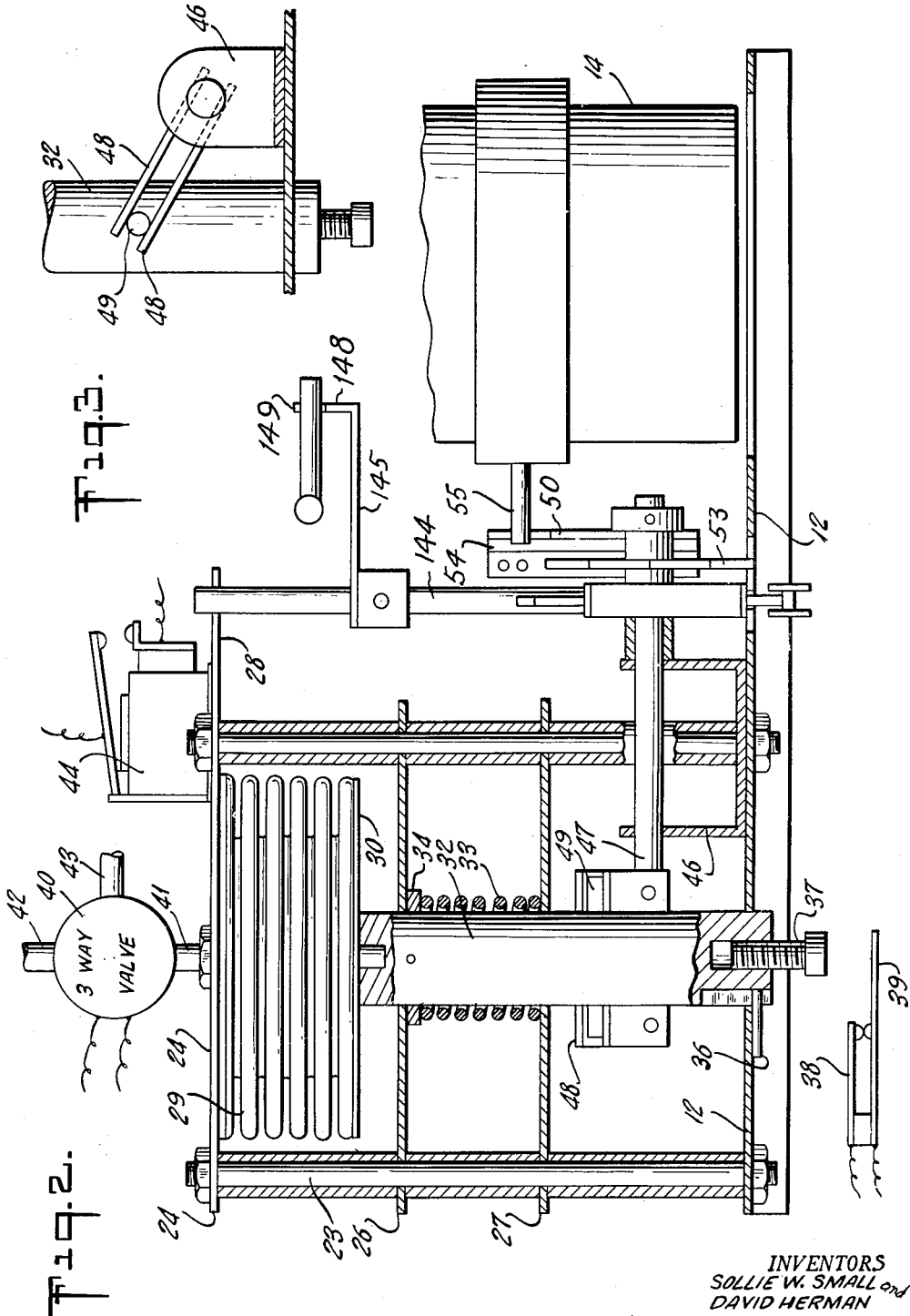

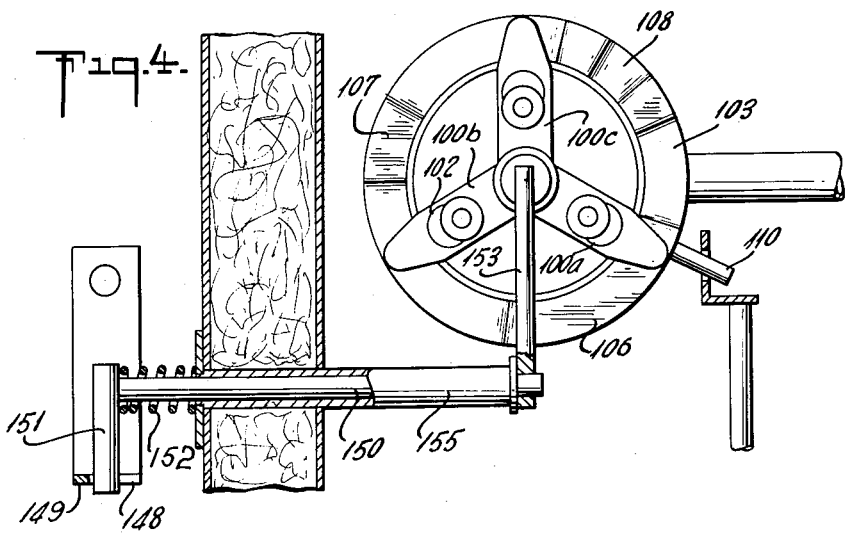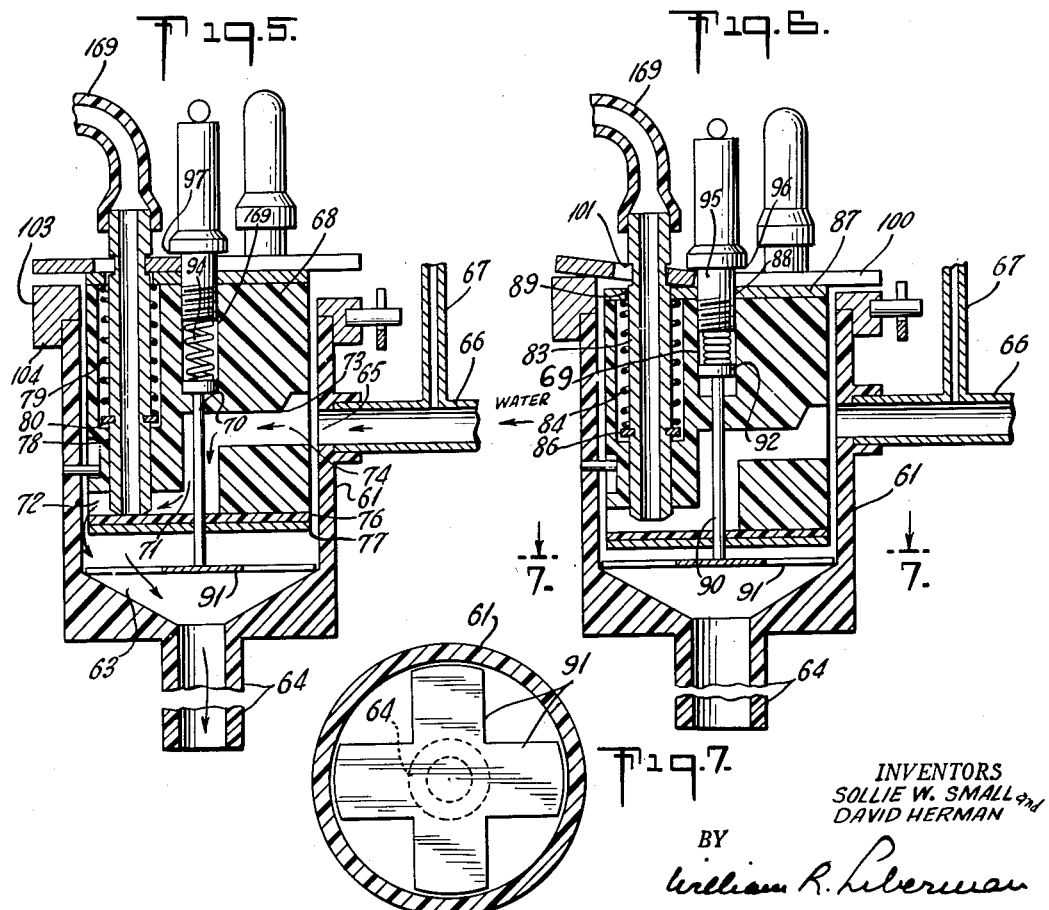

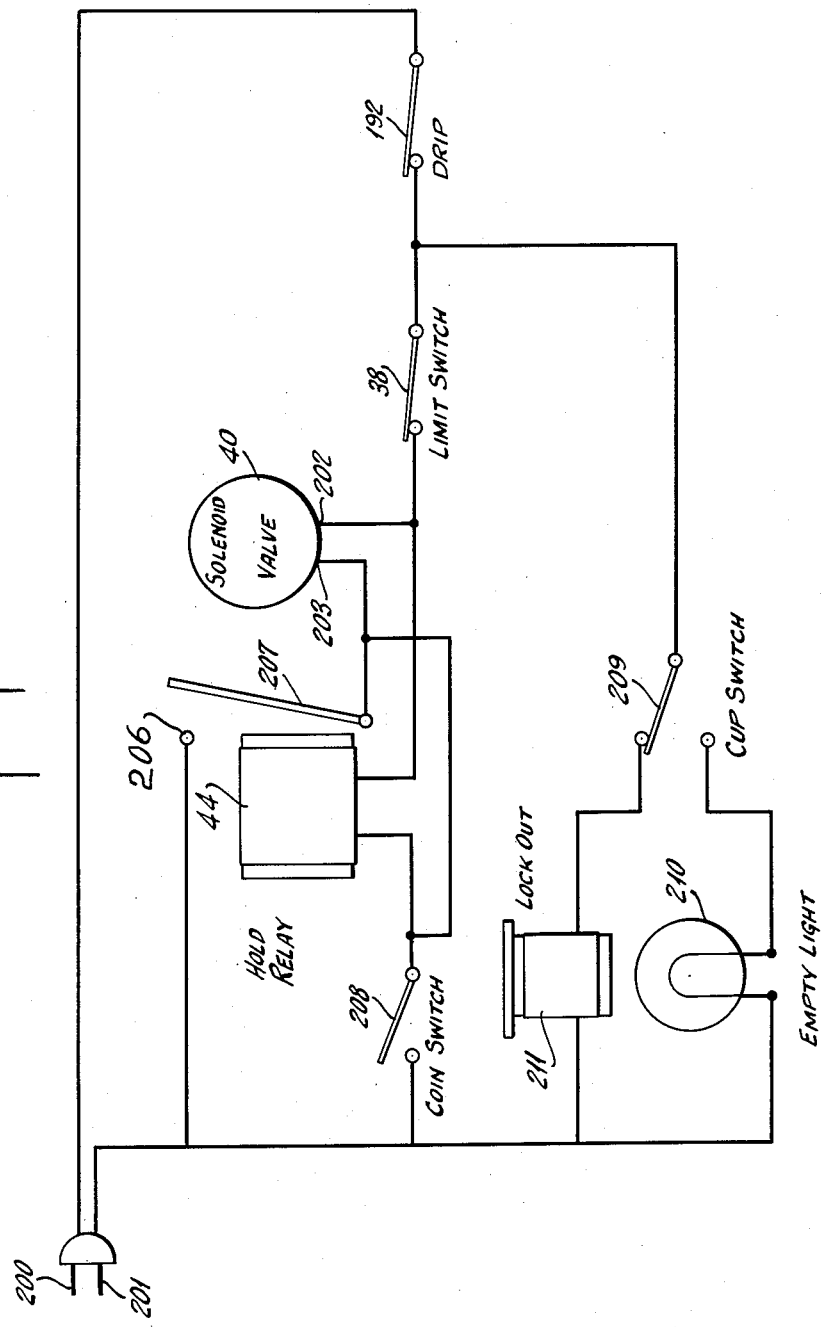

United States Patent Office 2,755,006
Patented July 17, 1956

2,755,006

DRINK DISPENSING MECHANISM

Sollie W. Small and David Herman, Newark, N. J.

Application October 3, 1951, Serial No. 249,452

16 Claims. (Cl. 226—46.2)

The present invention relates generally to improvements in dispensing machines, and it relates more particularly to an improved machine for automatically preparing and dispensing a drink in a cup, or other receptacle, ready for consumption.

There have been many automatic drink preparing and dispensing machines employed and proposed, but they have been highly complex and costly. These machines usually have an extensive and complex electrical system, including numerous relays, switches, electric valves, numerous electric motors, etc. Not only is this extensive electrical system expensive, but it is the source and cause for repeated and frequent breakdowns, resulting in high maintenance and servicing costs, and long periods of machine inoperativeness. Furthermore, the replenishment of the syrups and flavorings, and other consumables going into the preparation of the dispensed drinks is complicated and time consuming, thereby further increasing the costs of operation of such machines.

It is, therefore, a principal object of the present invention to provide an improved machine for automatically preparing and dispensing drinks.

Another object of the present invention is to provide an improved coin-operated drink preparing and dispensing machine, which requires a minimum of maintenance and servicing.

Still another object of the present invention is to provide an improved coin-operated drink preparing and dispensing machine, which is of rugged and inexpensive construction, and is characterized by its economy of electrical components.

A further object of the present invention is to provide an improved coin-operated drink preparing and dispensing machine, wherein the drink may be automatically selectively flavored.

Still another object of the present invention is to provide an improved coin-operated drink preparing and dispensing machine wherein the consumables, that is the flavoring and sweetening liquids, and the dispensing receptacles may be readily and simply replenished in a minimum of time.

The above, further and more specific objects of the present invention will become apparent from a reading of the following description taken in conjunction with the accompanying drawings, wherein Figure 1 is a front elevational view of one form of dispensing machine constructed according to and embodying the present invention, with the front door in open position;

Figure 2 is a side detail sectional view, with parts partially broken away, of the machine motivating and metering mechanism;

Figure 3 is a front detail view, partially in section, of a portion of the motivating mechanism illustrated in Figure 2;

Figure 4 is a top plan view of the mixing mechanism, illustrating part of the actuating and selecting mechanism;

Figure 5 is a front sectional view of the mixing mechanism in inoperative position;

Figure 6 is a front sectional view of the mixing mechanism in an operative position;

Figure 7 is a sectional view along line 7—7 of Figure 6;

Figure 8 is a front elevational view, illustrating part of the machine component motivating mechanism with a portion broken away and rotated 90°;

Figure 9 is a front sectional view of the water heating apparatus;

Figure 10 is a view partially in vertical section and partially in plan, illustrating the drink selecting mechanism;

Figure 11 is a sectional view along line 11—11 of Figure 10;

Figure 12 is a front elevational view illustrating the selector knob and indicia;

Figure 13 is a top plan view, partially broken away and partially schematic, illustrating the flavoring reservoirs;

Figure 14 is a front sectional view illustrating said reservoirs; and

Figure 15 is a schematic diagram of the electrical circuit of the present machine.

An important feature of the present improved dispensing machine resides in the mechanism employed in motivating the various components of the machine, such as the device for dispensing a cup or receptacle, the flavoring metering and mixing device, and the water measuring mechanism. The water which forms the base of the dispensed drink is generally derived from an external source of water under pressure which is connected to the drink dispensing machine. Advantage is taken of the energy or pressure head of this water particularly that contained in the amount of water employed in a single dispensed drink, to motivate a single dispensing cycle. In accordance with a preferred embodiment of the present invention, a metering chamber having a movable end wall, spring-urged to a retracted position, for example, an expandable bellows having closed end walls, is connected by way of a normally closed electrically operated three-way valve to a source of water under pressure. Upon the initiating of a dispensing cycle, the valve is energized and opened, allowing water to flow into the chamber to advance the movable end wall against the spring pressure. A switch disposed in the path of the movable wall is actuated when the desired amount of water enters the metering chamber and causes the de-energization and switching of the electric valve which connects the chamber interior to a dispensing nozzle by way of a heating system and mixing valve. The spring urges the movable wall to return to its retracted position, forcing a metered amount of water through the heating and mixing system and out of the discharge nozzle. The movement of the end wall to its advanced position, motivates the cup dispensing mechanism which delivers a cup to a tray beneath the drink discharge nozzle. The return of the movable end wall by the spring motivates the flavor mixing and dispensing mechanism and pours a measured prepared drink from the discharge nozzle into a cup. It is apparent from the above, that the principal mechanism of the machine requires very few electrical components and that these are energized only momentarily, that is, only during the filling of the metering chamber.

Another feature of the present invention resides in the improved drink mixing mechanism which includes a valve body member having main conduits formed therein communicating with inlet and outlet openings, and auxiliary conduits communicating with said main conduits by way of valves provided with seats disposed in the main conduits. An additional feature contemplates the connection of the auxiliary conduits to respective liquid flavoring reservoirs which have a common support and the detachable position of the valve body member to permit the simple removal and replacement of the reservoirs and mixing valve as a single unit.

Referring now to the drawings, and more particularly to Figure 1 thereof, the numeral 10 generally designates a cabinet which houses the various components and mechanisms of the present machine, and which is provided with a hinged front door 11, defining the front wall of the cabinet 10, and permitting access to the interior of the cabinet and to various parts of the machine for servicing and maintenance. A horizontal partition or shelf 12 is mounted in the cabinet 10 substantially midway between the top and bottom thereof, dividing the cabinet into upper and lower compartments, and supporting most of the machine operating mechanisms. The machine is provided with a hydraulic motivating and metering mechanism 13 which is mounted on the left rear side of the shelf 12, and is mechanically coupled to a cup dispensing device 14, positioned forward of the motivating mechanism 13, and to a flavoring dispensing and mixing mechanism 16 disposed in a suitably refrigerated insulated compartment 17 provided with a lid 17a and positioned to the right of the motivating mechanism 13. Also disposed in the refrigerated compartment 17 are flavoring containers 18, 18. The lower compartment of the cabinet 10 houses a water heating device 19. On the inner face of the door 11, are mounted a drink selecting mechanism 20, which engages and cooperates with the mixing mechanism 16 when the door 11 is closed, and a cup chute 15 and platform 21 which registers with the outlet of the cup dispenser 12 and the drink discharge nozzle. In addition, there is mounted on the bottom portion of the door 11, a drip tripping mechanism.

The hydraulic motivating and metering mechanism can best be seen in Figure 2 of the drawing, and includes a pair of uprights 23, mounted on the partition 12, and supporting by means of suitable spacing members, top, intermediate and bottom vertically spaced horizontal shelves 24, 26 and 27 respectively, the upper shelf 24 being provided with a forwardly projecting portion 28. Depending from the upper shelf 24, and hermetically sealed thereto, is an expandable bellows 29, formed of a flexible metal or other suitable material, and having its lower end sealed by a circular flat plate 30, which defines a wall movable with the lower end of the bellows 29, toward and away from the upper wall or shelf 24, between retracted and advanced positions. A rod 32 depends from, and is secured to the center of bottom movable wall 30, and passes through registering aligned circular holes formed in the shelves 26, 27 and 12. A helical compression spring 33 registers with the rod 32 between the shelves 26 and 27, bearing against the upper face of the shelf 27, and against an annulus 34 fixed to the rod 32 below the plate 26. Formed at the lower end of the rod 32 is a longitudinal groove which engages the guide 36, thereby restricting the rotation of the rod. A coaxial stroke adjusting screw 37 engages a corresponding tapped bore formed in the rod 32 and depends therefrom. A normally closed electric switch 38 is suitably mounted below the shelf 12, with its actuating arm 39 in alignment with the path of the screw 37. Furthermore, an electrically actuated three way valve 40 is mounted on the shelf 24 and has its inlet 41 connected to the interior of the metering and motivating chamber defined by the bellows 29 and walls 24 and 30, its outlet 42 connected to a source of water under pressure, for example, the municipal water supply, and the outlet 43 connected to the drink dispensing nozzle by way of the flavoring dispensing and heating mechanisms. When the valve 40 is not electrically energized, the inlet 41 communicates with the outlet 43 and upon energization of the valve 40, the inlet 41 communicates with the outlet 42. Also mounted on the shelf 24 is a holding relay 44, whose purpose will be hereinafter described.

The motion translating mechanism for actuating the machine components includes a bracket 46 mounted on the shelf 12, and rotatably supporting a transverse horizontal shaft 47. A pair of spaced parallel plates 48 are fixed to the innner end of the shaft 47, and are diametrically opposed, defining a yoke member, which engages pin 49 projecting transversely from the rod 32. The stroke of the rod 32 and the dimensions of the yoke 48 are such as to impart a rocking motion to the shaft 47 of slightly more than 45°. Mounted on the outer end of the shaft 47, and rotatable therewith, is a yoke member 50, provided with a radial pin engaging groove 51. Also mounted on the shaft 47 rearward of the yoke 50, are the joined ratchet 52 and cam member 53, which are freely rotatable in unison on the shaft 47. The yoke 50 is provided with a rearwardly extending flange 54 along a side edge thereof upon which is mounted a leaf spring 56 defining a pawl, the free end of which engages the ratchet 52. Furthermore, a second leaf spring 57, extending diagonally upwards, is mounted on the shelf 12 and likewise defines a pawl member which engages the teeth of the cam member 53. Moreover, the cam member 53 is provided with similar successive depressions 58 having sharp trailing edges 59 and sloping leading edges 60. Thus, upon each rocking of the shaft 47, by the reciprocating stroke of the rod 32, the yoke 51 is rocked, advancing the ratchet 52 and cam 53 45°, and bringing the advancing pawl 56 and the holding pawl 59 to successive teeth of the ratchet 52 and cam 53 respectively.

The cup dispenser 14 may be of any well known type, and in the present illustration is provided with an actuating rod or arm 55, which, upon movement in one direction about the vertical longitudinal axis of the dispenser 14, releases a cup and returns to its original position, engaging the next cup in the magazine. The end of the arm 55 engages the slot 51 in the yoke 50, so that the rocking of the yoke 50, upon a stroke of the motivating mechanism 13, reciprocates the arm 50, releasing a cup into the cup chute 15, which guides the cup in upright position onto the platform below the drink discharge nozzle.

The flavoring and water mixing mechanism is best illustrated in Figures 4–8 of the drawings, wherein 61 designates a cup shaped casing having a funnel shaped bottom wall 63 terminating in a drink discharge nozzle 64 and a cylindrical vertical wall having an inlet port 65 connected to a hot water feed pipe 66, provided with a syphon breaking vent pipe 67. Slidably nested in the housing 61 is a cylindrical valve body member 68, whose rotational movement is restricted in any well known manner and having an upper axial bore 69 communicating by way of an axial bore 70 of reduced cross-section with a lower axial bore 71. It should be noted that the spacing between the confronting cylindrical walls of the casing 61 and the body member 68 is of the order of .005 inch and that no water leaking above the casing has been experienced. Moreover, formed in the lower face of the body member 68 are three radially extending rectangular grooves 72, which communicate with the bore 71 and are angularly spaced at 120°. Also communicating with the upper portion of the bore 71 is a radial bore 73 which terminates in a longitudinally enlarged port 74 which registers with the valve port 65. Secured to the bottom face of the body member 68 are the superimposed disc members 76 and 77, which are formed of a resilient valve seating material such as plastic, rubber or the like, and a relatively stiff reinforcing material respectively and which together with the grooves 72 define radial conduits. The discs 76 and 77 are provided with axial bores in vertical alignment with the bore 70.

Communicating with each of the radial grooves or conduits 72, are vertical bores 78, having upper portions 79 of increased cross-section which join the lower portions by annular shoulders 80. A tubular valve member 83 is slidably positioned in each of the bores 78, extending above and below the body member 68 and having its lower portions inwardly tapered to a sharp circular edge. A compression spring 84 is disposed in each of the upper bore portions 74, and bears against the upper face of an annulus 86, fixed to the tube 83, adjacent the shoulder 80, and against the lower face of a circular plate 87, mounted on the upper face of the body member 68 and provided with an aperture 89, aligned with the bores 79, but having a smaller cross-section, substantially that of the outer cross-section of the tubes 83. The springs 84 normally urge the tubes 83 downwardly into contact with the valve seat disc 76 to effect a liquid tight seal between the lower edges of the tubes 83 and the valve seat 76 thereby closing the tubes 83.

A vertical rod 90 slidably registers with the bore 70 and the aligned bores in the discs 76 and 77, and bears against the mid portion of a flat spider member 91 which rests upon the upper periphery of the conical wall 63. The upper end of the rod 90 terminates in an enlarged head 92 disposed in the bore 69 and is urged downwardly by a helical compression spring 94, the upper end of which is engaged by the lower face of a rod 95. The lower end of the rod 95 is threaded and engages a corresponding tapped inner surface of the bore 69, and its upper end projects above the body member 68. An annular flange is formed on the rod 95 intermediate the ends thereof and is provided with a flat shoulder 96 confronting and spaced above the disc 87 to define an annular groove 97.

A valve opening finger 100a, 100b and 100c is associated with each of the tubes 78, and is mounted in radial fashion on the disc 87. The inner edge of each of the fingers 100 is arcuately shaped and loosely registers with the groove 97, whereas the outer side edges are inwardly tapered and project beyond the peripheral edge of the housing 61. Furthermore, each of the fingers 100 is provided with a longitudinal slot which engages a corresponding annular groove 101, formed in the upper peripheral walls of each of the tubes 83, each of the slots terminating in an enlarged circular aperture 102 to facilitate assembly of the device.

An annular valve operating selector cam 103 is rotatably mounted upon the upper edge of the housing member 61, and is provided with a depending wall 104 which engages the peripheral wall of the housing. The upper face of the selector cam 103 is provided with raised and depressed surfaces which cooperate with each of the fingers 100, to selectively actuate these fingers. Normally, the body member 68 is in its raised position by virtue of the compression spring 94, urging it upwardly by way of the rods 90 and 95 and spider 91. When the body member 68 is in this raised position, the fingers 100 are depressed and the lower edges of the tubes 83 urged into engagement with the valve seat 76 by the compression springs 84, thereby sealing the lower ends of the tubes 83. When the body member 68 is depressed by bearing down upon the upper face of the rod 95 against the pressure of the compression spring 94, those fingers 100 whose outer ends register with raised portions of the selector cam 103 are elevated, thereby lifting the corresponding tubes 83 and opening their lower ends above the seat 76 to the respective grooves or conduits 72. Each of the fingers 100 cooperates with a corresponding segment 106, 107 and 108 of the selector cam 103, so that predetermined tubes 83 may be selectively raised upon depression of the body member 68. The cam segment 106 consists of four successive raised sections, the cam segment 107 of two depressed sections, followed by two raised sections, and the cam segment 108 of four alternate depressed and raised sections. Thus, in the position illustrated in Figure 4 of the drawings, upon depression of the body member 68, only the tube 83, engaged by the finger 100a, will be raised. Upon movement of the selector cam 103, a counterclockwise increment corresponding to the angular extent of a segment section, the tubes 83 engaged by the fingers 100a and 100c will be raised upon depression of the body member 68. A further single increment advance of the selector cam 103 will result in the raising of the finger 100a and 100b, engaged tubes 83, upon depression of the body member 68, and all three tubes are raised in final increment advance of the selector cam 103. Thus, the tubes engaged by the following groups of fingers may be selectively raised by depression of the body member 68; 100a; 100a and 100c; 100a and 100b; 100a, 100b and 100c.

The mechanism for manipulating the cam 103 for selecting a desired group of tubes 83 to be raised and, hence, opened, includes a pin 110 extending radially from the selector cam 103 and engaging a slot formed in the wall of a bracket 111 mounted on the free end of a rod 112. The rod 112 is slidably supported by a suitable bushing 113, mounted in a wall of the refrigerated compartment 17 and is provided at its inner end with a rounded cap 114. Engaging the rod 112 between a shoulder of the bushing 113 and the confronting face of the cap 114 is a compression spring 116 which normally urges the rod 112 to its right, as viewed in Figure 10 of the drawings.

A bracket 117 is mounted on the upper inner face of the door 11, and swingably supports a depending channel shaped arm 118, by means of a pin 119. A second arm 120, provided with side flanges 121, which are in confronting abutment with the corresponding walls of the arm 118, straddles the lower portion of the arm 118, and is supported by means of a bolt 122 which passes through aligned openings in the arms 118 and 120. A helical compression spring 123 engages the screw bolt 122 and is entrapped between a nut 125, engaging the screw bolt 122 and the inner face of the arm 118, thus, normally resiliently retaining the arms 118 and 120 in abutting relationship and permitting the arm 120 to be swung outwardly about its upper edge from the arm 118. A horizontally rearwardly offset lip 126 depends from the lower end of the arm 120 and bears against the cap 114. Mounted on the arm 118 above the upper edge of the arm 120, is a transversely extending member 127, having a horizontally sloping front face of saw tooth cross-section defining four successively higher sloping steps 129 separated by sharp shoulders 130. An arm 131 is provided with a laterally extending integral shaft 132, which is rotatably supported by a bushing 133 mounted in the door 11. A knob 134 having a suitable hand 135 is fixed to the free end of the shaft 132 and disposed on the front face of the door 11. Formed in the lower end of the arm 131 is a transverse bore 136, which supports a pair of balls 137 by crimping the edges of the bore 136. The front ball 137 engages the sawtooth surface of the member 127, whereas the rear ball 137 rolls along the base plate of the bracket 117. The spring 116 is sufficient to urge the arm 118 rearwardly so that the member 127 bears against the ball 137 but inadequate to swing the arm 120 relative to the arm 118 against the urging of the spring 123. Thus, by rotating the knob to a desired selection, as designated by the indicia 138, the arm 131 is brought to a corresponding position wherein the ball 137 engages one of the steps 129 at the shoulder 130. This swings the arms 118 and 120 to a selected position, causing a corresponding movement of the rod 112, bracket 111, pin 110 and rotating the selector cam 103 to a position resulting in the actuation of the fingers 100a, 100b and 100c, in accordance with the selection made by way of the aforesaid rotation of the knob 134 and the opening of the corresponding valve tubes 83, upon depression of the body member 68.

As best seen in Figures 2, 4 and 8, the mixing mechanism is actuated during the dispensing cycle by the motivating device 13, by way of the cam 53. A bracket 140 is mounted on the under face of the shelf 12 and pivotally supports a beam 141. One end of the beam 141 is provided with an upright finger 142, having a transverse pin 143 at its upper portion, which engages the surface of the cam 53 and defines a cam follower. The other end of the beam 141 is connected to the lower end of a vertical movable rod 144, passing through apertures in the shelves 12 and 28 and supporting a laterally extending arm 145 which is adjustably mounted on the rod 144 in any suitable manner. The free end of the arm 145 has an upright flange partially cut away to provide a shoulder 148 and an ear 149. A rotatably mounted shaft 150 passes through a wall of the refrigerated compartment 17 by way of a flanged tubular bushing 155 and is provided at its outer end with a transverse arm 151, the end of which rests upon the shoulder 148 and is urged to bear against the ear 149 by a helical compression spring 152, engaging the shaft 150 and entrapped between the arm 151, and the confronting flange of the tubular bushing 155. A second arm 153 is mounted at the inner end of the shaft 150 and bears upon the upper end of the rod 95. Thus, upon the return stroke of the hydraulic motivating mechanism, the cam 53 is advanced counterclockwise, one tooth, rocking the beam 141 and raising and lowering the rod 144. The up and down motion of the rod 144 rocks the shaft 150 by way of the arm 145, which, in turn, rocks the arm 153, depressing and releasing the body member 68, thereby opening the selected valve tubes 83 for a short period.

The flavoring reservoir 18 is also disposed in the refrigerated compartment 17, and includes a substantially triangular mounting plate 156, having three depending collar members 157 integrally formed therewith. Formed in the inner wall of each of the collars 157, is a groove which retains a toroidal sealing gasket 158 formed of rubber or the like. Flavoring containers such as bottles 159, have neck portions which terminate in peripheral flanges 160, having tapered side walls 161 and flat bottom shoulders 162. The necks of the bottles 159 are brought into registry with the collars 157, the tapered flange side walls 161 engaging the gaskets 158 to effect an air tight seal. In order to retain and support the bottles 159 in air tight relationship with the collars 157, a second triangular plate 164 is provided which has radiating slots 165 formed therein, said slots being as wide as the width of the bottle necks, but less than the outer diameter of flange shoulders 163. The slots 165 engage the necks of the bottles 159, the shoulders 163 resting on the top face of the plate 164. A bolt 166 passes through aligned central openings in the plates 156 and 164, and is engaged by a threaded knob 167 which permits the tightening of the plates 156 and 164 for sealing and supporting the bottles 159, or the loosening of the plates 156 and 164, so that the bottles 159 may be removed and their contents replenished.

A tubular member 168 extends through a corresponding opening in the plate 156, coaxial with each of the collars 157, and reaches substantially to the bottom of each of the bottles 159. The tubes 168 are flexible and each connected to a corresponding valve tube 83. Disposed in the bottom of each of the tubes 168 is an orifice member 168a, whose opening is in accordance with the rate of liquid feed desired. Formed in the plate 156 is an annular bore 170 which communicates by way of radial bores 171 and vertical bores 172 with the regions encompassed by the collars 157 and, hence, the interiors of the bottles 159. Furthermore, the annular bore 170 also communicates with the side wall of the plate 157 by way of a bore 173, the outer end of which is of enlarged cross-section. A tubular coupling member 174 engaging a toroidal gasket 175 formed of rubber, or the like (adjacent its inner end), is removably positioned in the bore 173 and in air tight relationship therewith. The other end of the coupling member 174 is connected by way of a flexible tubing 176 to a substantially constant air pressure source. This pressure source may be of any well known type and may include a small electrically driven compressor controlled by a suitable pressure switch. It is important to note that merely by disconnecting the coupling member 173 and swinging the arm 153 out of the vertical path of the body member 68, which may be done by sliding the shaft 150 inwardly in opposition to the spring 152 and by disconnecting the coupling member 174, the entire flavoring reservoir and the body member 68 may be simply removed as a unit and promptly replaced with a corresponding unit containing a full reservoir of flavorings. The units may thus be brought to a central station where the replenishment of the flavorings may be accomplished with facility.

The outlet 43 of the three way valve is connected to a heat exchange tubular coil 180, the outlet of which is connected to the inlet of the flavoring mixing mechanism by way of the port 65. The coil 180 is immersed in a heated liquid held in a container 181 which is surrounded by suitably insulated walls to reduce heat losses. Also immersed in the liquid is an electrical heating element 182 which is connected by way of a thermostatically operated switch 183 to a source of electric current. The switch 183 is set to maintain the liquid temperature at just below the boiling point of water. Also communicating with the interior of the container 181 is a vent tube 185 and a filling tube 184.

Mounted on a side wall of the cabinet 10 is a coin receiving slug rejecting device 186 of a well known type, which is adapted to receive and pass a proper coin and momentarily close a normally open electric switch. Moreover, this coin device 186 is provided with a well known electrical lock-out mechanism which, if not electrically energized, locks the device 186, thereby preventing the insertion of coins. The device 186 is aligned with a slot 187 in the door 11, when the door 11 is closed. Positioned below the cup platform, and pivotally supported on the inner face of the door 11 is a drip tripping receptacle 190, which is provided with an opening in its upper wall to catch any liquid falling upon the cup platform which is provided with suitable apertures. The receptacle 190 is pivotally connected to the door 11 by a pin 191 disposed at a corner of the receptacle 190. A normally closed electric switch 192 is also mounted on the door 11 and is engaged by an arm 194 projecting from the upper edge of the receptacle 190. Any well known means, not shown, is provided for maintaining the receptacle 190, when not filled to a predetermined level, in a position where the switch 192 is not actuated, and for permitting the receptacle to swing to a switch opening position when this level is exceeded.

The electrical circuit controlling the operation of the present improved drink dispensing machine, includes an electrical plug for connecting the machine to a suitable current and including terminals 200 and 201. The terminal 200 is connected by way of the series connected normally closed drip receptacle switch 192 and the normally closed bellows limit switch 38 respectively, to a terminal 202 of the operating solenoid of the three way valve 40 and a terminal 204 of the solenoid of the holding relay 44. The other terminal 203 of the valve solenoid is connected to the other terminal 206 of the hold relay solenoid as well as to the armature 207 thereof. Connected between the plug terminal 201 and the terminal 206, and the connected circuit, is a normally opened coin actuated switch 208. Furthermore, the junction point of the switches 38 and 192 are connected to the blade of a double throw switch 209, one contact of which is connected through an electric lamp 210 to the terminal 201, and the other contact of which is connected through the energizing coil of a lock out device 211, to the terminal 201, the device 211, when de-energized, preventing the acceptance of coins by the mechanism 186, as aforesaid.

The switch 209 is responsive to the presence of cups in the cup magazine, the blade being connected to the lock out terminal contact when the magazine contains cups, and being connected to the lamp contact when the magazine is empty.

Considering now the operation of the improved drink dispensing machine when employed in the preparation and dispensing of hot coffee, the bottles 159 contain coffee flavoring, cream and sugar syrup, and are connected by way of tubing to the tubes 83 controlled by the fingers 100a, 100b, and 100c respectively. In the machine's inoperative electrically energized position, the bellows 29 is contracted and is connected by way of the three way valve 40 through the heating coil 180 to the mixing mechanism 16, the output nozzle of which is directed toward the cup supporting platform. The various electrical components are in the positions shown in Figure 15 of the drawings, and the mixing mechanism is in the position shown in Figure 5 of the drawings.

To operate the machine, a drink selection is made by rotating the knob 134 to the desired position, which rotates the cam 103 to a corresponding position, and a coin is inserted in the coin actuating mechanism 186 which drops the coin upon the switch 208, momentarily closing the same. The closing of the switch 208 causes the energization of the valve solenoid and the hold relay solenoid. The hold relay contacts are then closed, thereby forming an additional circuit connecting the hold relay terminal 206 and the valve terminal 203 to the plug terminal 201, so that the valve and relay solenoids continue to be energized following the opening of the switch 208. The energization of the valve solenoid results in the bellows being connected to a source of water under pressure by way of the inlet 42. The water under pressure enters the bellows 29, causing it to expand and advance the movable wall 30 and the rod 32 downwardly loading the compression spring 33. The end of the downward stroke is established when the screw 37 bears against the switch arm 39, opening the switch 38, and breaking the circuit to the valve solenoid and the relay solenoid, de-energizing them and permitting them to return to their original positions. During the downward stroke, a measured quantity of water enters the bellows 29, which may be varied by adjusting the screw 37. Furthermore, the yoke 50 is rotated counterclockwise as seen in Figure 8, causing the cup dispensing device 14 to drop a cup into the chute 15, which is guided into upright position on the cup platform below the drink delivering nozzle. Moreover, the pawl 56 engages a succeeding tooth on the ratchet 52. Upon de-energization of the valve solenoid following the downward stroke, the bellows is reconnected to the drink discharge nozzle, as aforesaid, and the spring 33 urges the bellows to return to its original position delivering the measured amount of water through the heater, mixing mechanism, and the drink discharge nozzle. As previously described, the return stroke of the rod 32 rotates the yoke 50 clockwise, the pawl 56 engaging the ratchet 52, and causing the ratchet 52 and cam 53 to rotate. The rotation of the cam 53 urges, through the mechanical coupling, the mixing valve body member 68 downwardly and the relative raising and opening of the preselected valve tubes 83. The lower edge of the raised tubes 83 disengages the valve seat 76 and the corresponding syrups or cream flow from the bottles 159, as a result of the air pressure therein, into the hot water stream which is urged into the mixing mechanism by way of port 65 from the heating coil 180, by the water forced in by the contracting bellows 29. It should be noted that the hot water flows along the valve seat 76 and the edges of the valve tubes 83, keeping them clean, the flow continuing after closing of the tubes 83. The mixed hot water syrups and cream are discharged from the bottom of the mixing mechanism into a waiting cup. Upon the return of the bellows to its retracted position, the cycle is completed and may be repeated by insertion of another coin.

In the event that the liquid in the drip receptacle 190 exceeds a predetermined level, the switch 192 is opened to deactivate the machine by breaking the electrical circuit and the lockout is de-energized, thereby closing the coin receiving mechanism 186. The lockout 211 is also automatically de-energized upon depletion of the cup stock, by the switch 209 which thereupon connects the lamp 210 into the electrical circuit, to give an empty signal. It should here be pointed out that the syrup dispensing period is a function of the strength of the compression spring 33 and the orifice in the port 43 which preferably offers a large resistance to the water flow and is, therefore, the limiting factor. Thus, the syrup dispensing cycle may be varied by suitably adjusting the spring 33 or the orifice in the port 43.

There has been described and illustrated a preferred embodiment of the present invention, but it is apparent that numerous omissions and alterations may be made without departing from the spirit thereof.

We claim:

1. A drink dispensing machine comprising a chamber defined by an expandable bellows provided with a stationary end wall and an opposite end wall movable between advanced and retracted positions, a drink discharge nozzle, an electrically actuated three way valve having a first port communicating with the interior of said chamber, and a second port communicating with said nozzle, and a third port adapted to be connected to a source of liquid under pressure, said first port communicating with said second port when said valve is not electrically energized and with said third port upon electrical energization of said valve, means including a normally closed switch for connecting said valve to a source of current, means for opening said switch upon said movable wall reaching a predetermined advanced position, means actuated by the movement of said movable wall for delivering a receptacle into registry with said drink discharge nozzle, and a flavoring delivery mechanism including a valve actuated by the movement of said movable wall.

2. A drink dispensing machine as claimed in claim 1, wherein there is provided spring means for urging said movable wall to a retracted position, said spring means being loaded by the advancing movement of said movable wall upon electrical energization of said valve connecting said chamber to said source of liquid under pressure, and returning said wall to its retracted position upon de-energization of said valve.

3. A drink dispensing machine as claimed in claim 1, wherein said receptacle delivery means are motivated by the movement of said wall towards its advanced position, and the flavor delivery valve is motivated by the movement of said wall towards its retracted position.

4. A mixing device of the character described, comprising a valve body member having formed therein a conduit extending between an inlet and outlet opening, and a bore communicating with said conduit, a tubular member slidably mounted in said bore, a valve seat positioned in said conduit in alignment with said bore, and means urging said tubular member toward said conduit, whereby the lower edge of said tubular member engages said valve seat to seal said lower edge.

5. A mixing device of the character described, comprising a valve body member having formed therein a plurality of connecting conduits communicating with openings in the wall thereof, and a plurality of bores communicating with each of said conduits, a substantially flat valve seat positioned in each conduit in alignment with said bores, a tubular valve member slidably mounted in each of said bores, spring means urging said tubular members toward said conduits into sealing engagement with said valve seats, and means for selectively raising said tubular members to effect the opening of the lower ends thereof and provide communication between said tubular members and said conduits.

6. A mixing device of the character described, comprising an open topped valve casing having an inlet port and an outlet port formed therein, a valve body member vertically slidably positioned in said casing and having formed therein a plurality of connecting conduits communicating with said ports, and a plurality of bores communicating with each of said conduits, a substantially flat valve seat positioned in each conduit in alignment with said bores, a tubular valve member slidably mounted in each of said bores, spring means urging said tubular members toward said conduits into sealing engagement with said valve seats and means for selectively raising said tubular members to effect the opening of the lower ends thereof and provide communication between said tubular members and said conduits.

7. A mixing device as claimed in claim 6, wherein a movable finger element engages each of said tubular valve members at the upper portion thereof, and is positioned on the top of said body member and extends beyond the peripheral edge thereof.

8. A mixing device of the character described, comprising a cup shaped valve casing, having an inlet port and an outlet port formed therein, a substantially cylindrical valve body member vertically slidably positioned in said casing and having formed therein a plurality of connecting radially extending conduits communicating with said ports, and a plurality of longitudinal bores communicating with each of said conduits, and extending above the upper face of said body member, a substantially flat valve seat positioned in each conduit in alignment with said bores, a tubular valve member slidably mounted in each of said bores, spring means urging said tubular members toward said conduits into sealing eingagement with said valve seats, a movable finger element engaging each of said tubular valve members, and means for selectively raising said finger, and hence, said tubular members to effect the opening of the lower ends thereof and provide communication between said tubular members and said conduits.

9. A mixing device as claimed in claim 8, wherein said movable finger elements project beyond the upper peripheral edge of said valve casing and an annular cam is rotatably mounted upon and coaxial with said casing and is provided with a contoured upper surface which cooperates with said finger elements to selectively raise said finger elements.

10. A mixing device as claimed in claim 9, wherein there are provided spring means to normally urge said body member into an upper position, whereby said finger elements are in inoperative association with said cam.

11. A drink dispensing machine comprising a chamber having a movable end wall movable between advanced and retracted positions, a drink discharge nozzle, an electrically actuated three way valve having a first port communicating with the interior of said chamber, and a second port communicating with said nozzle, and a third port adapted to be connected to a source of liquid under pressure, said first port communicating with said second port when said valve is not electrically energized and with said third port upon electrical energization of said valve, means including a normally closed switch for connecting said valve to a source of current, means for opening said switch upon said movable wall reaching a predetermined advanced position, means actuated by the movement of said movable wall for delivering a receptacle into registry with said drink discharge nozzle, and a flavoring delivery mechanism including a valve actuated by the movement of said movable wall.

12. A drink dispensing machine comprising a chamber having an end wall movable between advanced and retracted positions, a drink discharge nozzle, electrically actuated valve means alternatively movable between a first position affording communication between the interior of said chamber and said discharge nozzle of said chamber and a source of liquid under pressure, and means including a first switch electrically connected to said valve means and actuated by the movement of said end wall to control the position of said valve and means actuated by the movement of said end wall for delivering a receptacle into registry with said drink discharge nozzle.

13. A drink dispensing machine in accordance with claim 12, including spring means urging said end wall to its retracted position, said spring means being loaded upon the movement of said end wall toward its advanced position.

14. A drink dispensing machine in accordance with claim 12, including means carried by said end wall and adapted to engage and actuate said first switch said means being adjustable to control the point at which it engages said switch relative to the position of said end wall.

15. A drink dispensing machine in accordance with claim 12, including a flavoring reservoir, means including a normally closed metering valve affording communication between said reservoir and the vicinity of said discharge nozzle and means adapted to open said metering valve during the return stroke of said end wall from its advanced to its retracted position.

16. A drink dispensing machine in accordance with claim 12, wherein said valve means normally assumes said first position and said valve control means includes a second normally open switch and a self holding relay connected in a circuit with said first switch and said valve means whereby momentary closing of said second switch energizes said relay and urges said valve means to said second position and said relay is de-energized upon actuation of said first switch and said valve is returned to said first position.

References Cited in the file of this patent
UNITED STATES PATENTS

| | | |
|---|---|---|
| 574,156 | Lippincott | Dec. 29, 1896 |
| 1,229,852 | Abernathy | June 12, 1917 |
| 1,470,381 | Lamb | Oct. 9, 1923 |
| 2,371,432 | Di Pietro | Mar. 13, 1945 |
| 2,427,429 | Waite et al. | Sept. 16, 1947 |